W. P. DURTNALL.
GENERATION OF POLYPHASE ALTERNATING ELECTRIC CURRENTS OF VARYING FREQUENCIES.
APPLICATION FILED NOV. 1, 1909.

1,098,345.  Patented May 26, 1914.

Witnesses:

Inventor
William P. Durtnall
By
James L. Norris
Atty.

UNITED STATES PATENT OFFICE.

WILLIAM PETER DURTNALL, OF HERNE BAY, ENGLAND.

GENERATION OF POLYPHASE ALTERNATING ELECTRIC CURRENTS OF VARYING FREQUENCIES.

1,098,345.  Specification of Letters Patent. Patented May 26, 1914.

Application filed November 1, 1909. Serial No. 525,735.

*To all whom it may concern:*

Be it known that I, WILLIAM PETER DURTNALL, a subject of the King of Great Britain, residing at Herne Bay, Kent, England, have invented new and useful Improvements in the Generation of Polyphase Alternating Electric Currents of Varying Frequencies, of which the following is a specification.

This invention relates to the generation of polyphase alternating electric currents of varying frequencies, thereby providing speed regulation for the motor or motors of any vessel, locomotive, vehicle, or other apparatus which derives its power from such currents.

By the said invention, it is possible where necessary to obtain increased torques and slower speeds relatively to those of the prime mover, or slower speeds and lower powers of the motor or motors for any lower vessel, locomotive or vehicle speeds.

In the accompanying drawings, I have shown how my said invention may be conveniently and advantageously carried into practice.

Figure 1:
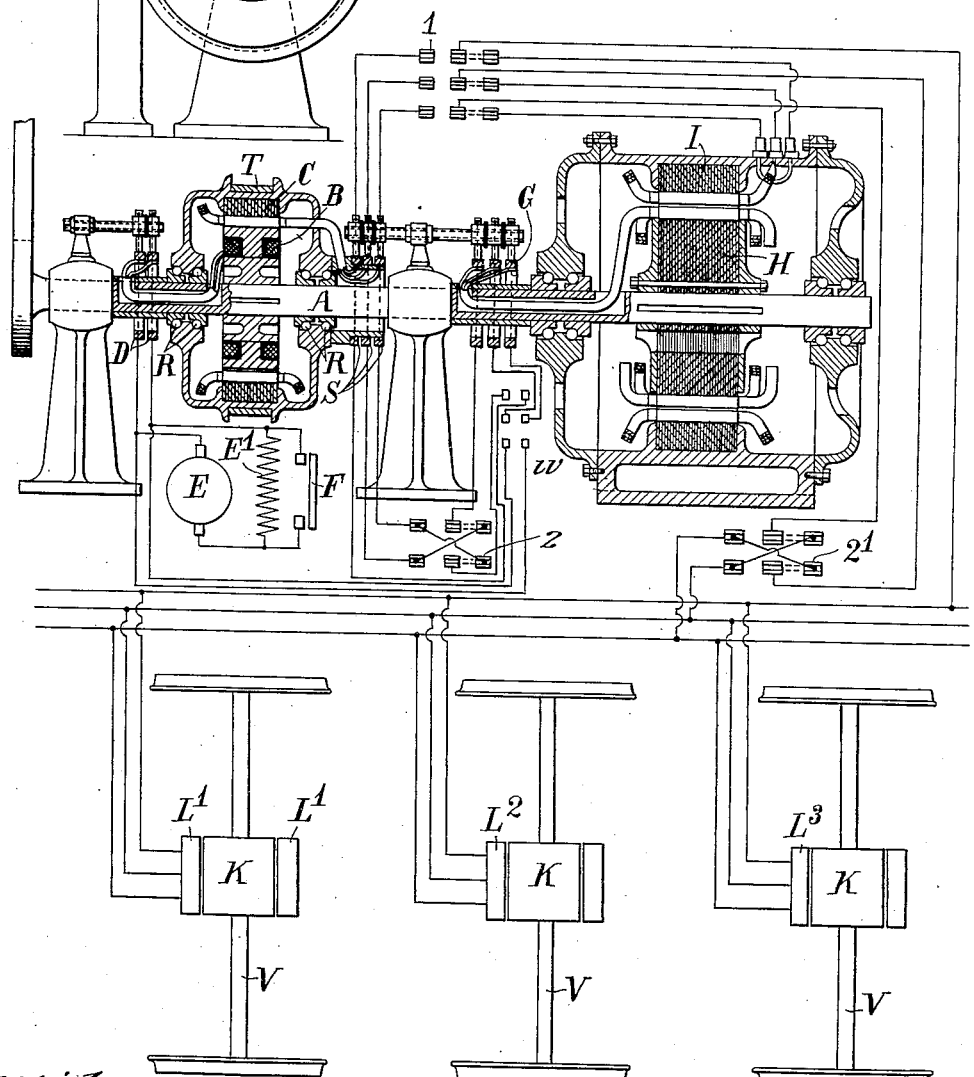
Figure 2:
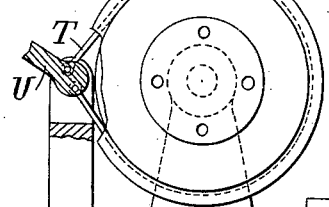

In these drawings, Figure 1 is a diagram of an arrangement for driving one or more of the axles of each of the vehicles in a rail- or road-train and for obtaining high-starting torques, and Fig. 2 is an end view of the brake mechanism of the alternator in this plant.

A multiple pole electro-magnet B is mounted on the shaft A which may be driven by a suitable prime-mover such as a steam turbine or an internal combustion engine which may run at a constant speed together with the rotor H of a machine which may be termed a transformer-generator. These parts B, H revolve and at the same speed. The multiple-pole magnet B is excited through slip-rings D, D from a continuous-current exciter E, which is preferably series-wound and is adapted to have its field-magnet or magnets E' short-circuited by means of a switch F. An armature or stator C is mounted outside the multiple pole magnet B and provides polyphase alternating current of a certain periodicity, which can be either sent direct to the stator L of the induction motor or motors, the rotor K of which will then run at a certain speed, or the above polyphase alternating current may be connected to the primary of the transformer-generator. In the example shown, the rotor H is wound as the primary, the connection being made through slip-rings G, G in such a manner that the resultant magnetic flux revolves at the air gap in a direction opposite to that of the mechanical rotation (at say one-third, or other suitable fraction of the mechanical rotation speed) the current so generated can then be drawn off from the secondary or stator I of the transformer-generator at a periodicity which is variable according to the number of poles in the rotor and stator of the said transformer-generator, and in the rotor and stator of the polyphase alternating current generator B, C, as described above (the generator may have more or less poles than the transformer-generator, accordingly as it is desired that the said generator B C shall supply current of intermediate or minimum periodicity). The current from the secondary I can be then taken direct to the stator L of the motor or motors, which will then run at a speed set by the periodicity of the polyphase alternating current delivered thereto.

Now in order to get a higher speed from the motor or motors, and also if necessary to enable more power to be taken therefrom, two of the phases (if three-phase current) of the connections between the armature C of the alternator and the rotor H of the transformer-generator can be reversed, so that the currents then flow in the opposite direction and the resultant magnetic flux at the air gap of the transformer generator revolves in the same direction as, but at say one-third, or other suitable speed ahead of the mechanical rotation of the primary of the transformer generator, therefore current can then be taken from the secondary of the transformer generator, at higher periodicity and voltage and consequently power, as part of the power from the prime-mover is delivered to the polyphase alternating current generator, and is converted into electrical energy, which being put into the revolving primary H of the transformer-generator, acts to excite the same as a field-magnet of a generator, the armature of which is the stator I, and this transformer-generator absorbs a further amount of the mechanical power of the prime-mover, which is converted into electrical energy in the secondary winding I of the transformer generator, to which is added the energy due to the rotation of the magnetic field on the rotor H produced by the polyphase current coming from the polyphase alternating current generator, so that the total power of the prime-mover (minus the ordinary losses) may be represented in electrical energy at the terminals of the secondary I of the transformer generator. If it be desired still further to vary the periodicity, voltage and power as delivered to the motor or motors, the armature C of the generator may be mounted on bearings R, R, with the necessary slip-rings S, S, S to take the current off, so that it may if necessary revolve in the same direction to the multiple magnet B. By arranging a suitable braking arrangement, e. g. the band T and tightening lever U (which is shown in the normal position with the armature stationary), the armature C may be allowed to rotate at any speed intermediate of zero and that of the field magnet B and in the same direction as the latter. By letting the armature C slip freely in the band T, it will ultimately run at the same speed as the multiple magnet B, when the periodicity of the whole system will have fallen to zero. On the other hand, by driving the armature C in the opposite direction to the field magnet, the periodicity and voltage may be increased. By applying a generating plant such as those above described to a motor or motors with a single winding on its stator, three set speeds may be obtained with a squirrel-cage rotor or rotors; if necessary a higher speed can be obtained or any intermediate speed between the three above speeds and zero.

In order to facilitate the change from one speed to another, the voltage is in each case brought to zero in the whole system by closing the switch F before altering the connections, so as to deënergize the field of the exciter E. When the change is made, the switch F is opened, the voltage will rise again and the motor run at the new speed.

The current of different periodicities is shown supplied to a plurality of motors L', L², L³ each driving one of the axles V of a rail- or road- train. By this arrangement, high initial torque can be obtained, for instance, when it is desired to start the train on an upgrade, since it is a well known fact that induction motors have a high torque when supplied with current of a lower frequency than the normal. Thus, the acceleration or retardation of the train can be efficiently controlled entirely by means of the brake T, U. Here the reversal of the two phase-connections between the slip-rings S and G is effected by means of a reversing switch 2, and the connection of the motors L, L, L, to either the alternator armature C or the secondary I of the transformer-generator by means of a 3-pole 2-way switch 1, these switches 1, 2, each having an intermediate position in which the alternative circuits are both open.

The following specific example may be given of the operation of plants such as those illustrated: A steam turbine drives the shaft A at 1,000 R. P. M., the alternator B, C being a four-pole separately-excited three-phase machine. On the shaft A is also mounted the primary H of a twelve-pole transformer-generator, the secondary member I of which remains stationary. The electrical energy from the above combination is received by a one hundred-pole squirrel-cage polyphase alternating-current induction-motor coupled e. g. to a ship's propeller shaft. The operation of the above plant, when the connections are as indicated in Fig. 1, will be as follows:—Since the turbine speed equals 1,000 R. P. M., and the alternator has four poles, the current from said alternator will be of 4,000 alternations (half-periods) per minute, and this current when applied to the above motor, will give the latter a synchronous speed of 40 R. P. M. If now the alternator be disconnected from the motor, and the current be sent instead into the revolving primary H of the transformer-generator, in such a direction that the magnetic flux revolves in the primary H in the opposite direction to that in which the latter is being driven by the prime mover, the current being taken to the windings in the primary by means of the slip-rings G, and brush-gear, the resultant periodicity in the fixed secondary I will be as follows:—Taking the periodicity of the alternator-current again at 4000 alternations per minute and taking the speed of the primary of the transformer-generator at 1000 R. P. M., with 12 poles, the current in the secondary I will be of a periodicity of 12,000 minus 4000 alternations per minute due to the backward rotation of the magnetic field on the rotor, that is to say there will be 8000 alternations per minute in the secondary I of the transformer-generator and by taking the current from this secondary to the above motor the resultant synchronous speed of the motor or propeller shaft will be 80 R. P. M., and if necessary higher voltage and therefore more power. Now disconnect the current from the generator C to the primary slip-rings G, reverse two of the phases of the in-going three-phase current from the generator C to the primary H of the transformer-generator, reconnect, and the resultant conditions will be as follows: Taking the periodicity of the alternator-current again at 4000 alternations per minute, then since the speed of the transformer-generator-primary H is 1000 R. P. M., with 12 poles, the current in the secondary I will be of a periodicity of 12000 plus 4000 alternations per minute, that is to say 16000 alternations per minute in the secondary of the transformer-generator, then by taking this secondary current to the above motor, the synchronous speed of the motor or propeller shaft, will be 160 revolutions per minute, if necessary at higher voltage and therefore more power. It will thus be seen that, in the above quoted case, three set speeds may be procured on a single-stator-winding squirrel-cage induction polyphase-current motor, or by enabling the armature of the four-pole generator to rotate as above described, the periodicity and consequent voltage of the whole system may be varied to any desired degree, and the speed of the said one-hundred-pole motor with it, and with good mechanical efficiency, and a minimum of electrical losses. The above motor or motors may be coupled to a ship's propeller shaft or shafts, or to the axle or axles of a vehicle, locomotive, train or the like, as the case may be, in the most suitable manner in order that in the case of the locomotive or train the full weight, (or as may be arranged for) of the train or locomotive and the like may be utilized for tractive effort, braking and power distribution.

By arranging the connections through suitable switch-gear, as shown for example at 2', a full power reverse direction of speed can be given to the above motor or motors, this being effected by reversing two out of say three phases of the current at the terminals of the motor or motors without alternating the speed or direction of rotation of the prime mover.

A fourth speed can be obtained by supplying direct current to two of the slip-rings G of the rotor of the transformer-generator. This can be obtained from the exciter E by means of a switch W, the said exciter being meanwhile disconnected from the slip-rings D by means of a switch X. The speed of the rotor K of the motor will then be as follows:—Taking the common speed of the prime mover, shaft A, and primary H at 1000 R. P. M., and since the said primary has twelve poles, the periodicity of the current supplied to the motor-stator L will be 12,000 alternations per minute. Since, moreover, the motor-stator has one hundred poles, the speed of the rotor of this motor when running at synchronism will be 120 R. P. M.

When it is desired to run the motor-shaft or shafts at a high speed, the starting is preferably effected at the lowest or at one of the lower speeds, the speed being brought up gradually by passing from one speed to another by either of the methods above described. This is rendered necessary by reason of the difficulty which exists of starting induction motors by means of currents of periodicities corresponding to their normal speeds.

By the above arrangements, a large saving of steam can be made as compared with the existing steam-turbine-driven ships, and in vehicles, locomotives and the like so fitted, and in cases of application of internal combustion engines, a reverse motion can be efficiently given to the driven shafts or axles, and a very powerful braking effect provided on vessels, vehicles, locomotives, trains and the like, without affecting the prime-mover as regards speed or direction of rotation. The above makes a very efficient electrical speed reduction and power transmission gear, and thus provides what is so much desired for marine propulsion, road traction and the like, i. e. a high speed, economical, light-weight prime-mover, and slow speed efficient propeller or propellers, axles and the like.

By the arrangement above described, any desired number of induction motors can be run at any one of a considerable number of speeds in either direction as desired.

I claim:—

1. A plant for the generation of polyphase electric currents of varying periodicity for a constant speed of the prime mover, said plant comprising a prime mover, a polyphase alternator, a polyphase transformer-generator comprising a rotor and a stator, a mechanical driving connection between said prime mover, the rotary member of said alternator, and the rotor of said transformer-generator, and electrical connections between said alternator and the primary of said transformer-generator, said connections including means for interchanging two of the phases of the circuit between said alternator and said transformer-generator, for the purpose specified.

2. A plant for the generation of polyphase electric currents of varying periodicity for a constant speed of the prime mover, said plant comprising a prime mover, a polyphase alternator, a polyphase transformer-generator comprising a rotor and a stator, a mechanical driving connection between said prime mover, the rotary member of said alternator, and the rotor of said transformer-generator, means for generating direct current combined with said alternator, electrical connections between said alternator and said transformer-generator, said connections including means for interchanging two of the phases of the circuit between said alternator and said transformer-generator and for connecting said direct current generating means with two of the phase connections of the primary of said transformer-generator.

3. A plant for the generation of polyphase electric currents of varying periodicity for a constant speed of the prime mover, said plant comprising a prime mover, a polyphase alternator, means for permitting the rotation of the normally non-rotating member of said alternator, means for controlling the rotation of said normally non-rotating member, a polyphase transformer-generator comprising a rotor and a stator, a mechanical connection between said prime mover, the rotary member of said alternator and the rotor of said transformer-generator, and electrical connections between said alternator and the primary of said transformer-generator, said connections including means for interchanging two of the phases of the circuit between said alternator and said transformer - generator, for the purpose specified.

4. A plant for the generation of polyphase electric currents of varying periodicity for a constant speed of the prime mover, said plant comprising a prime mover, a polyphase alternator, a polyphase transformer-generator comprising a rotor and a stator, a mechanical driving connection between said prime mover, the rotary member of said alternator, and the rotor of said transformer-generator, means for generating direct current combined with said alternator, electrical connections between said alternator and said transformer-generator, said connections including means for interchanging two of the phases of the circuit between said alternator and said transformer-generator and for connecting said direct current generating means with the primary of said transformer-generator.

WILLIAM PETER DURTNALL.

Witnesses:
THOMAS A. BAILEY,
H. D. JAMESON.

---

Copies of this patent may be obtained for five cents each, by addressing the "Commissioner of Patents Washington, D. C."